United States Patent
Carstensen et al.

(10) Patent No.: US 6,896,621 B2
(45) Date of Patent: May 24, 2005

(54) TORQUE LIMITING COUPLING (75) Inventors: Bernd Carstensen, Ruppichteroth (DE); Andreas Sarfert, Bonn (DE); Eberhard Wilks, Daufenbach (DE); Wilhelm Schott, Cologne (DE); Gottfried Kohnen, Cologne (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/268,523

(22) Filed: Oct. 10, 2002

(65) Prior Publication Data

US 2003/0078106 A1 Apr. 24, 2003

(30) Foreign Application Priority Data

Oct. 19, 2001 (DE) ........................................ 101 51 162

(51) Int. Cl.7 ................................................. F16D 7/00
(52) U.S. Cl. ........................................ 464/37; 192/56.1
(58) Field of Search .............................. 464/30, 35–39; 192/55.1, 56 R, 56.1, 71; 56/DIG. 6

(56) References Cited

U.S. PATENT DOCUMENTS

| | | | |
|---|---|---|---|
| 3,347,062 A | * 10/1967 | Schumann et al. | ............ 464/37 |
| 4,468,206 A | 8/1984 | Herchenbach et al. | |
| 4,802,326 A | 2/1989 | Geisthoff | |
| 5,120,913 A | * 6/1992 | Leach et al. | ............... 464/37 X |
| 5,342,241 A | 8/1994 | Kampf | |

FOREIGN PATENT DOCUMENTS

| | | | |
|---|---|---|---|
| CH | 243403 | 7/1946 | |
| DE | 1 035 986 | * 8/1958 | ............... 192/56 R |
| DE | 32 05 513 C1 | 3/1983 | |
| DE | 41 37 829 A1 | 5/1993 | |
| EP | 0 733 820 A1 | 9/1996 | |
| EP | 1 072 810 A1 | 1/2001 | |
| RU | SU 696198 | 5/1979 | |

OTHER PUBLICATIONS

European Search Report dated Mar. 22, 2004, EP 02016146.

* cited by examiner

*Primary Examiner*—Greg Binda
(74) *Attorney, Agent, or Firm*—Harness, Dickey & Pierce, P.L.C.

(57) ABSTRACT

A torque limiting coupling has a first coupling hub (2) with first driving members (10), and a second coupling hub (27) with second driving members (35). The hubs (2, 27) are jointly received in a coupling sleeve (46) and are rotatable independently of one another. When a set torque is exceeded while the first coupling hub (2) is driven in one of two driving directions of rotation N1 or N2, the second coupling hub (27) is subjected to a force which ensures that, in the driving direction of rotation N1, the driving members (10) of the first coupling hub (2) are transferred into the disconnected position and that, in the driving direction of rotation N2, the second driving members (35) of the second coupling hub (27) are transferred into the disconnected position.

11 Claims, 6 Drawing Sheets

TORQUE LIMITING COUPLING

CROSS-REFERENCE TO RELATED APPLICATIONS

This application claims priority to German Patent Application No. 10151162.0 filed Oct. 19, 2001, which application is herein expressly incorporated by reference.

FIELD OF THE INVENTION

The invention relates to a torque limiting coupling, in particular for driving, or for being used in the drives of, agricultural implements or machinery.

BACKGROUND OF THE INVENTION

DE 41 37 829 C2, which corresponds to U.S. Pat. No. 5,342,241, illustrates a torque limiting coupling with a coupling hub and a coupling sleeve centered around one another on a longitudinal axis. The coupling sleeve includes a circular-cylindrical bearing bore which rotatably supports the coupling hub by its circular-cylindrical outer face. Circumferentially distributed, slot-like first recesses, which are each delimited by two parallel guiding faces, are provided on the outer face of the coupling hub. The slot like recess form a setting axis and start from the outer face. The slot-like recesses each accommodate a first driving member which is adjustable along the setting axis. The driving members include parallel planar contact faces which are guided between the two parallel guiding faces. The driving members can be set to assume a torque transmitting position where the driving members project beyond the outer face of the coupling hub. In a disconnected position, the driving members are retracted into the coupling hub. For the one and only engaged driving direction of rotation, each driving member, towards its head, includes a torque transmitting face which adjoins the first contact face. In the torque transmitting position, each driving member projects beyond the outer face of the coupling hub. Each driving member is in contact with a corresponding supporting face of a groove of the coupling hub. Towards the first contact face, the torque transmitting face assumes an obtuse angle. The supporting face in the groove is inclined in the same way. The side face of the groove, positioned opposite the supporting face, extends in a manner corresponding to that of the second contact face, which is parallel to the first contact face. In the driving direction of rotation, the supporting face is preceded by a chamfer. The above-described design applies to all grooves in the coupling sleeve. The number of grooves corresponds to the number of driving members. A supporting member, loaded by a spring, is arranged in each recess at the driving member end facing away from the supporting face. Each driving member and each supporting member includes two faces which are arranged at different angles. The two faces are arranged in pairs and correspond to one another. The two faces serve to support the driving member in the torque transmitting position. The two faces load the driving member in the disconnected position by a force which is lower in the direction towards the torque transmitting position than in the torque transmitting position.

The torque limiting coupling enables an implement to be driven only at the torque specifically designed for the implement. If an agricultural implement, whose driveline starting from the power take-off shaft of a tractor includes such a torque limiting coupling, is subject to clogging, the driving members, because of the arrangement of the torque transmitting faces and the supporting faces, retract from the torque transmitting position into the disconnected position. The coupling hub can rotate faster in the driving direction of rotation than the coupling sleeve. Only when the rotational speed of the coupling hub relative to the coupling sleeve drops below a predetermined speed is there enough time available to allow the driving members to return into the grooves when the coupling hub rotates relative to the coupling sleeve. The disconnecting function is provided in only one driving direction of rotation.

The torque limiting couplings in DE 32 05 513 C1, which corresponds to U.S. Pat. No. 4,468,206, provide two diametrically arranged driving members that are loaded by a centrally arranged supporting cam. The grooves in the coupling sleeve and the driving member portions entering the grooves are symmetric. The grooves and driving members are both inclined at an angle relative to the adjoining contact face. Thus, a torque limiting function exists in both directions of rotation. However, the disadvantage of this assembly is that such a torque limiting coupling operates like a ratchet. Accordingly, when the coupling hub rotates relative to the coupling sleeve, during overloading, the driving members frequently enter and leave the torque transmitting position. This is particularly disadvantageous in implements operating at high torque values because of the damage that results in premature wear to the edges of the grooves in the coupling sleeve in the region of transition and to the bearing bore. However, a torque limiting function is provided in both possible driving directions of rotation.

SUMMARY OF THE INVENTION

It is an object of the present invention to provide a torque limiting coupling which, even if drive is available in two opposed directions of rotation, a safe torque limiting function and constant engagement and disengagement as well as wear are reduced to a minimum.

In accordance with the invention, a torque limiting coupling, in particular for driving, or drives of agricultural implements or machinery include a longitudinal axis. A first coupling hub has a first outer face with first recesses starting from the first outer face.

A first driving member is present per first recess. The first driving member is adjustably guided between a torque transmitting position and a disconnected position. In the transmitting position, the first driving member projects beyond the first outer face of the first coupling hub. In the disconnected position, the driving member is retracted back into the first outer face. The first driving members and their ends include a first torque transmitting face and, facing away from the first torque transmitting face, a second torque transmitting face.

At least one first spring per first driving member arranged in the first coupling hub, loads the driving member to assume the torque transmitting position. A second coupling hub has a second outer face and second recesses starting from the second outer face. A second driving member is present per second recess. The second driving member is adjustably guided in a second recess between a torque transmitting position and a disconnected position. In the active transmitting position, the driving members project beyond the second outer face. In the disconnected position, the driving member retracts into the second coupling hub. The second driving member end, projecting beyond the second outer face, includes a third torque transmitting face and, facing away from the third torque transmitting face, a fourth torque transmitting face.

At least one second spring per second driving member received in the second coupling hub, loads the driving member towards the torque transmitting position. One single coupling sleeve includes a bearing where both coupling hubs are rotatably received by their outer faces and arranged along the longitudinal axis one behind the other. The one single coupling sleeve in the bearing bore includes grooves which are distributed according to the first and second recesses of the two coupling hubs. The grooves extend parallel relative to the longitudinal axis. The grooves have a supporting face which is adapted to the identically designed first and third torque transmitting faces of the first and second driving members. The supporting face extends along the length of the groove. The side face of the groove, positioned opposite the supporting face, is adapted to the extension of the identically designed second torque transmitting face of the first driving member and fourth torque transmitting face of the second driving member.

An advantage of this design is that it is possible to use two identically designed coupling hubs. The driving members and the springs, too, can be of identical design. Only one single coupling sleeve is provided. The sleeve needs only one type of grooves. The arrangement of the torque transmitting faces and of the respective supporting faces at the grooves extend in the same direction in both coupling hubs. This means that the grooves can be produced by broaching. In the first driving direction of rotation, the transmission of torque starts from the first coupling hub. The first coupling hub is the driving part that provides drive, via the first driving members and the first torque transmitting faces, to the coupling sleeve. The torque is transferred from the coupling sleeve, via the side faces of the grooves and the fourth torque transmitting faces, in the full amount to the second driving members and from there to the second coupling hub. Because of the orientation of the second torque transmitting faces and the second side faces, the second coupling hub in connection with the coupling sleeve and the second driving members do not have a torque limiting function in the first driving direction of rotation. Vice versa, when the first coupling hub drives in the second driving direction of rotation, which is opposed to the first driving direction of rotation, the first coupling hub does not have a disconnecting function relative to the coupling sleeve. This is due to the fact that the transmission of torque is effected by the second torque transmitting faces of the first driving members via the first side faces of the grooves in the coupling sleeve. The coupling sleeve, in turn, drives the second coupling hub. The supporting faces associated with the grooves of the coupling sleeve contact the associated torque transmitting faces of the associated second driving members. Accordingly, when torque is transmitted in the second driving direction of rotation, a torque limiting function does exist between the second coupling hub and the second driving members relative to the coupling sleeve.

According to a further embodiment of the invention, the first driving members and the second driving members, at their respective ends arranged in the first and second recesses, each include two load faces. The load faces are arranged at different angles. A supporting member is provided per first and second driving members. The supporting member includes two pressure faces corresponding to the load faces. The supporting member is received between the first and, respectively, the second spring and the associated first and, respectively, the second driving member of the first and, respectively, second coupling hub.

According to a further embodiment, the first and second springs are received in a respective bore of the associated first and, respectively, the second coupling hub. The bores are open towards the associated first or second recess. The supporting member is preferably received in the first and, respectively, the second recess.

Furthermore, towards the supporting faces of the grooves, the bearing bore is provided with a chamfer. The effect of this measure is that the distance which the driving members have to cover until they engage the grooves is increased. Thus, the acceleration rate achievable by the force of the springs is not sufficient in terms of time to transfer the driving members into the torque transmitting position. During this period of time, the driving members have already passed the grooves during the relative rotation and have abutted the chamfer.

A separate disk is arranged between the first coupling hub and the second coupling hub in order to prevent the two coupling hubs from influencing each other. The disk prevents the movement of the first and second driving members from being influenced. The separating disk should preferably be continuous, so that said two hubs are completely separate from one another.

At the end faces facing away from the separating disk, a supporting disk is arranged at the end faces of the first coupling hub and of the second coupling hub. The end faces face away from one another. The supporting disks are held by securing rings fixed to the coupling sleeve. The supporting disks cover the end faces of the two coupling hubs and, in addition, guide the driving members together with the separating disk.

Furthermore, the first and the second coupling hub each include an attaching bore, with teeth, which is centered on the longitudinal axis. The teeth secure the respective coupling hub to an input or output shaft. In this connection, it is advantageous if the separating disk is designed to be continuous, so that the depth of insertion of the input or output shaft to be attached is limited.

In a first embodiment, the first recesses and/or the second recesses are designed to be slot-like and extend parallel to the longitudinal axis. Accordingly, the first driving members and/or the second driving members are flat, or oblong sliders. According to a further embodiment, the second contact face includes the second torque transmitting face and the fourth contact face includes the fourth torque transmitting face and each are designed as planar faces.

In a further embodiment, two first driving members and/or two second driving members are provided which are loaded jointly by centrally arranged first and second supporting members. The driving members and the supporting cams as well as the coupling hubs can be designed as described in connection with the torque limiting coupling according to DE-PS 32 05 513, which corresponds to U.S. Pat. No. 4,468,206, the drawings and specifications of which are expressly incorporated by reference.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
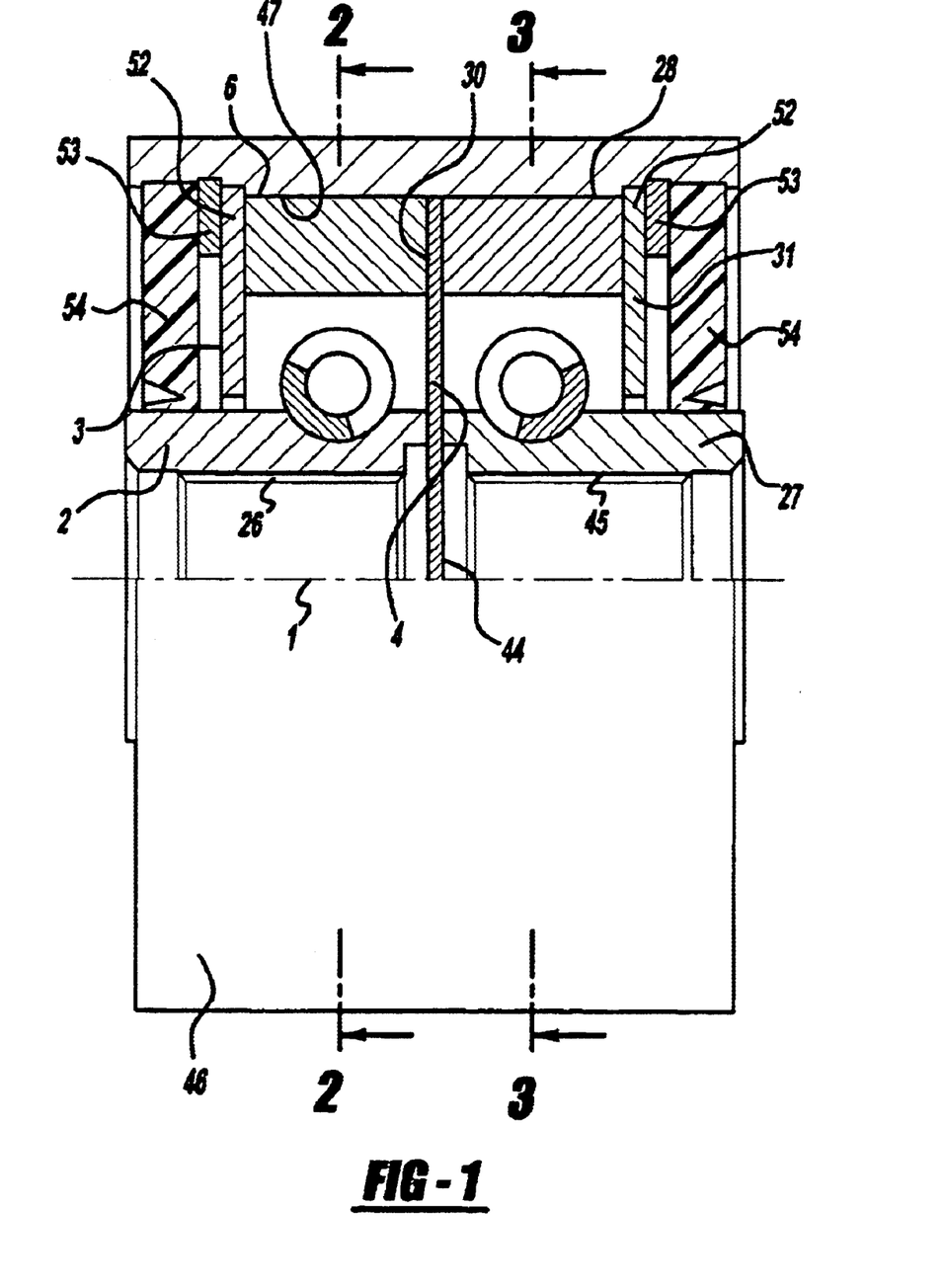
FIG. 1 is a half longitudinal section view of an inventive torque limiting coupling of a first embodiment.
Figure 2:
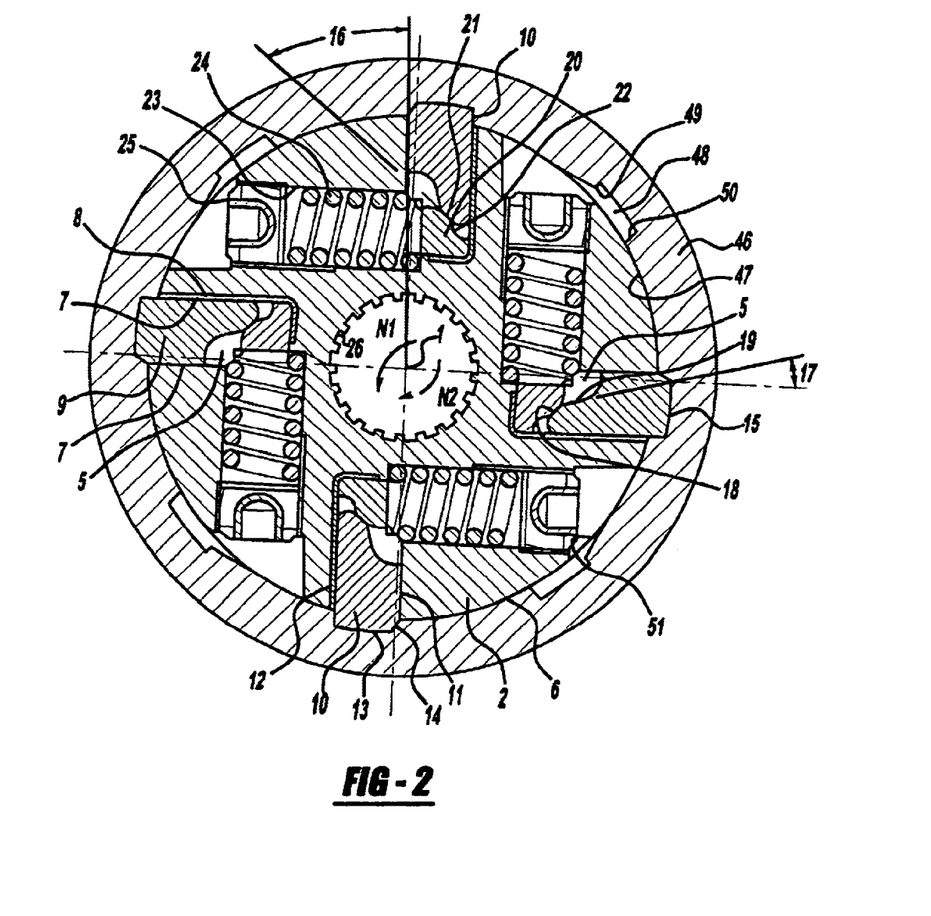
FIG. 2 is a section view along line II—II of FIG. 1.
Figure 3:
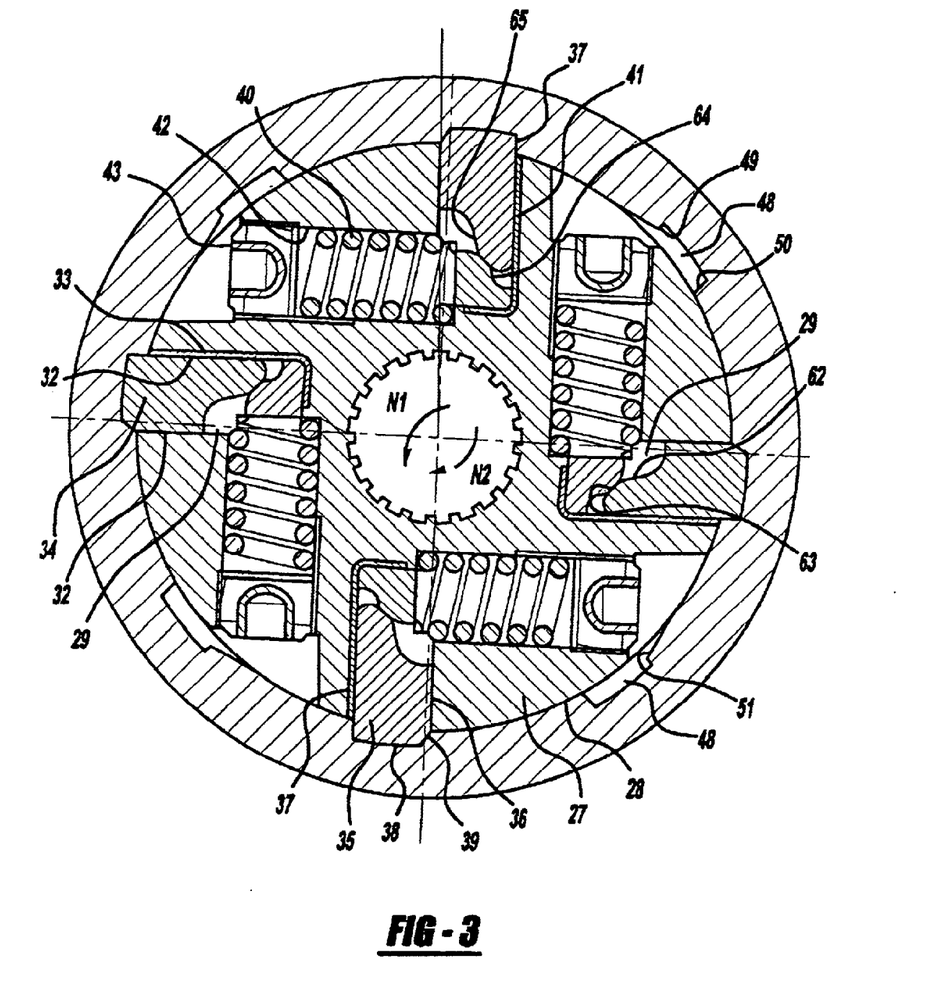
FIG. 3 is a section view along line III—III of FIG. 1.

The torque limiting coupling according to FIGS. 1 through 3 is centered on longitudinal axis 1. The individual components rotate around and along the longitudinal axis 1.

The torque limiting coupling has a first coupling hub 2 with a first end face 3 and a second end face 4. The first outer face 6 of the first coupling hub 2 is in the form of a circular cylinder with its axis centered on the longitudinal axis 1. The first coupling hub 2 include slot-like first recesses 5 which start from the first outer face 6 and which are delimited by two parallel first guiding faces 7. The guiding faces 7 are arranged so as to extend parallel to the longitudinal axis 1 and define a first setting axis 9. The two first guiding faces 7 of each first recess 5 are offset in parallel relative to a radius referring to the longitudinal axis 1. Furthermore, a first insert 8 is included in each recess 5 which largely assumes the function of supporting the torque. If a first insert 8 is provided which delimits the recess 5, then one of the first guiding faces 7 of a first driving member 10, to be described in greater detail below, forms part of the insert 8.

The first driving member 10 includes a first contact face 11 and, parallel extending, a second contact face 12. The first driving member 10 is guided in the first recess 5. At its portion projecting from the first outer face 6, the first driving member 10 is delimited by a first head face 13. A first torque transmitting face 14 is arranged between the first head face 13 and the first contact face 11. The torque transmitting face 14 together with the first contact face 11, encloses an obtuse angle 15. The first torque transmitting face 14 extends parallel to the longitudinal axis 1. The second contact face 12 forms the second torque transmitting face and, in consequence, extends as far as the head face 13. At the portion remaining in the first recess 5, at the end opposite the first head face 13, the first driving member 10 has a first load face 18 and a second load face 19. The first load face 18 is arranged relative to the first contact face 11 at an angle 16 which is greater than the angle 17, which the second load face 19 encloses relative to the first contact face 11.

In the torque transmitting position of the first driving member 10, the first load face 18 is loaded by a first supporting member 20. The first supporting member 20 has a corresponding first pressure face 21. In addition, the first supporting member 20 has a second pressure face 22 which extends in accordance with the second load face 19. The first coupling hub 2 is provided with a first bore 23. The first bore 23 extends at a right angle relative to the first setting axis 9. A first spring 24 is received in the first bore 23. The spring 24 is in the form of a pressure spring. The spring 24, at the end remote from the first supporting member 20, is supported on a screw 25. The screw 25 is threaded into a matching threaded portion of the first bore 23. The first spring 24 loads the associated first driving member 10 towards the torque transmitting position. In the torque transmitting position, the driving member 10 projects beyond the first outer face 6 of the first coupling hub 2.

It can be seen that in the present embodiment, there are provided four such assemblies with first driving members 10. They are designed like the above-described assembly.

Along the longitudinal axis 1, behind the first coupling hub 2, a second coupling hub 27 is arranged which starts from the first end face 3 of the first coupling hub 2. The design of the second coupling hub 27 corresponds to that of the first coupling hub 2. The second coupling hub 27 also has a circular-cylindrical second outer face 28 which is centered on the longitudinal axis 1.

The second coupling hub 27, like the first coupling hub 2, includes circumferentially distributed, slot-like second recesses 29. The recesses 29 start from the second outer face 28 and open towards the third end face 30 and towards the fourth end face 31 of the second coupling hub 27. The delimiting walls of the second recesses 29 can, optionally, form second guiding faces 32, with a second insert 33 being introduced therebetween. Second guiding faces 32 extend parallel relative to one another. Between the second guiding faces 32, a second setting axis 34 is formed along which the second driving member 35 is displaceable between a torque transmitting position, projecting beyond the outer face, and a disconnected position, retracted into said outer face.

Each second driving member 35 has a third contact face 36. The third contact face 36, in the driving direction of rotation N1 of the first coupling hub 2, is positioned in front. This is due to the second coupling hub 27, too, rotates in the driving direction of rotation N1. A fourth contact face is provided which faces away form the third contact face 36. The fourth contact face forms the fourth torque transmitting face 37 and extends parallel relative to the third contact face 36.

At the portion projecting from the second outer face 28, each second driving member 35 is delimited by a second head face 38. The second head face 38, in the direction towards the third contact face 36, is followed by a third torque transmitting face 39. The two faces 38, 39, like in the embodiment of the first driving members 10, enclose an obtuse angle relative to one another.

The second driving members 35 is also loaded loading into the torque transmitting position by at least one second spring 40 per second driving member 35. A second supporting member 41 is inserted therebetween and is received in each second recess 29. Each second spring 40 is received in a second bore 42 and is supported against a second screw 43 threaded into a corresponding threaded portion of the second bore 42.

With respect to the pairs of load faces provided at the ends of the second driving member 35, which enter into an operating connection with one another and which ends face away from the second head faces 38 of the second driving members 35 and remain in the second recesses 29, and with respect to the pressure faces 64, 65 of the second supporting members 41 cooperating with the load faces 62, 63, reference is made to the description of the respective first load faces 18 and second load faces 19 of the first driving members 10 and to the description of the first pressure face 21 and second pressure face 22 of the first supporting members 20.

A separating disc 44 is arranged between the two coupling hubs 2, 27. The separating disc 44 is supported by the first coupling hub 2 by its second end face 4 and by the second coupling hub 27 by its third end face 30. The first coupling hub 2 and the second coupling hub 27 are jointly received in one single coupling sleeve 46. The single sleeve 46 has a circular-cylindrical bearing bore 47 centered on the longitudinal axis 1. The bearing bore 47 receives the first coupling hub 2 via its first outer face 6 and the second coupling hub 27 via its second outer face 28. Accordingly, the first and second hubs are rotatable relative to one another around the longitudinal axis 1.

Supporting disks 52 are arranged next to the first end face 3 of the first coupling hub 2 and the fourth end face 31 of the second coupling hub 27. The support disks 52 are each held in a bore step of the coupling sleeve 46. Thus, the disks 52 are pushed towards one another and are secured away from one another by securing rings 53. The rings 53 engage corresponding grooves in the coupling sleeve 46. In addition, seals 54 are included to seal the space between the coupling sleeve 46, on the one hand, and one of the two coupling hubs 2, 27, on the other hand. Depending on the requirements, the seals 54 can be designed to be oil-proof. Thus, an oil filling for the torque limiting coupling can be provided. However, in such a case, additional oil-proof seals must be provided between the coupling hubs 2 and 27 and the separating disc 44.

Grooves 48 are arranged in the bearing bore 47 of the coupling hub 46. The grooves 48 extend parallel to the longitudinal axis 1 and are circumferentially distributed in accordance with the first driving members 10 and the second driving members 35. The grooves 48, in the first driving direction of rotation N1, include a correspondingly designed supporting face 49 which is positioned in front relative to the first torque transmitting face 14 of the first driving members 10 and to the second torque transmitting face 39 of the second driving members 35. A chamfer 51 is arranged in front of the supporting face 49. The course taken by the side face 50 of each groove 48, which is positioned opposite said supporting face, corresponds to that of the second contact face 12 of each first driving member 10 and to that of the fourth contact face 37 of each second driving member 35 which. The contact faces 11 and 39 cooperate with the supporting face 49. In total, eight grooves 48 are provided as compared to four first driving members 10 and, respectively, second driving members 35, so that a plurality of positions of engagement exists.

If the first coupling hub 2 shown in FIGS. 1 and 2 is driven in the first driving direction of rotation N1 (by a drive not illustrated), torque is transmitted from the first coupling hub 1, via the first driving members 10 and the first torque transmitting faces 14, to the associated supporting faces 49 of the grooves 48 and thus to the coupling sleeve 46. The full amount of torque is transmitted by the coupling sleeve 46 and, respectively, by the side faces 50 of the grooves 48 to the fourth torque transmitting face 37 of the second driving members 35 and to the second coupling hub 27. A torque introduced via the first attaching bore 26 of the first coupling hub 2 is thus transmitted to the output element or output shaft inserted into the second attaching bore 45 of the second coupling hub 27. An agricultural implement is then driven by the output shaft. If the implement is blocked, for instance if a stone causes clogging, the second coupling hub 27 stands still relative to the first coupling hub 2, which continues to rotate in the first driving direction of rotation N1. The coupling sleeve 26 also stands still. Thus a relative rotation occurs between the first coupling hub 2 and the coupling sleeve 46.

If the object is to remove a substance causing clogging in the implement to be driven in the driving direction of rotation N1, this can be achieved, for instance, by reversing the driving direction of rotation for example. For this purpose, the first coupling hub 2 is driven in a driving direction of rotation N2, which is opposed to the driving direction of rotation N1. In the process, the coupling sleeve 46 is driven by torque via the supporting means of the first driving members 10 by their second torque transmitting faces 12 at the side faces 50 of the associated grooves of the coupling sleeve 46. Thus, driving is effected by the full amount of driving torque.

If in the second driving direction of rotation N2, which extends in the direction opposite to that of the first driving direction of rotation N1, a blockage occurs in the implement to be driven, the second coupling hub 27 remains stationary, it does not rotate. However, the coupling sleeve 46, which is driven by the first coupling hub 2, continues to rotate relative to the second coupling hub 27. Since the supporting faces 49 of the grooves 48 are supported on the respective second torque transmitting faces 39 of the second driving members 35, the second driving members 35 are displaced inwardly along the second setting axis 34. The second driving members 35 are moved into the disconnected position retracted into the second coupling hub 27.

If in the two driving directions of rotation N1 or N2 the respective driving speed is reduced, the first driving member 10 and, respectively, the second driving members 35 can enter a corresponding groove 48 in the coupling sleeve 46. Thus, the torque transmitting position is assumed.

Figure 4:
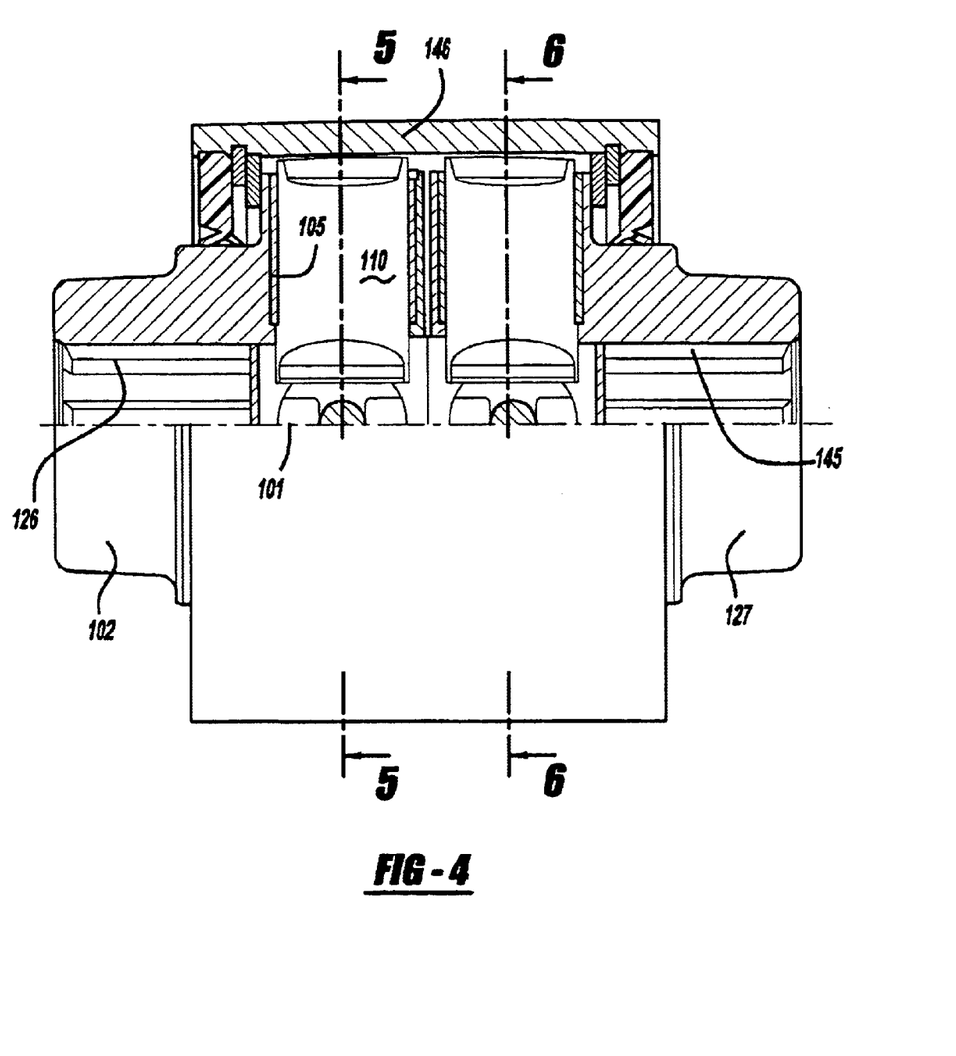
FIG. 4 is a half longitudinal section view of an inventive torque limiting coupling of a second embodiment.
Figure 5:
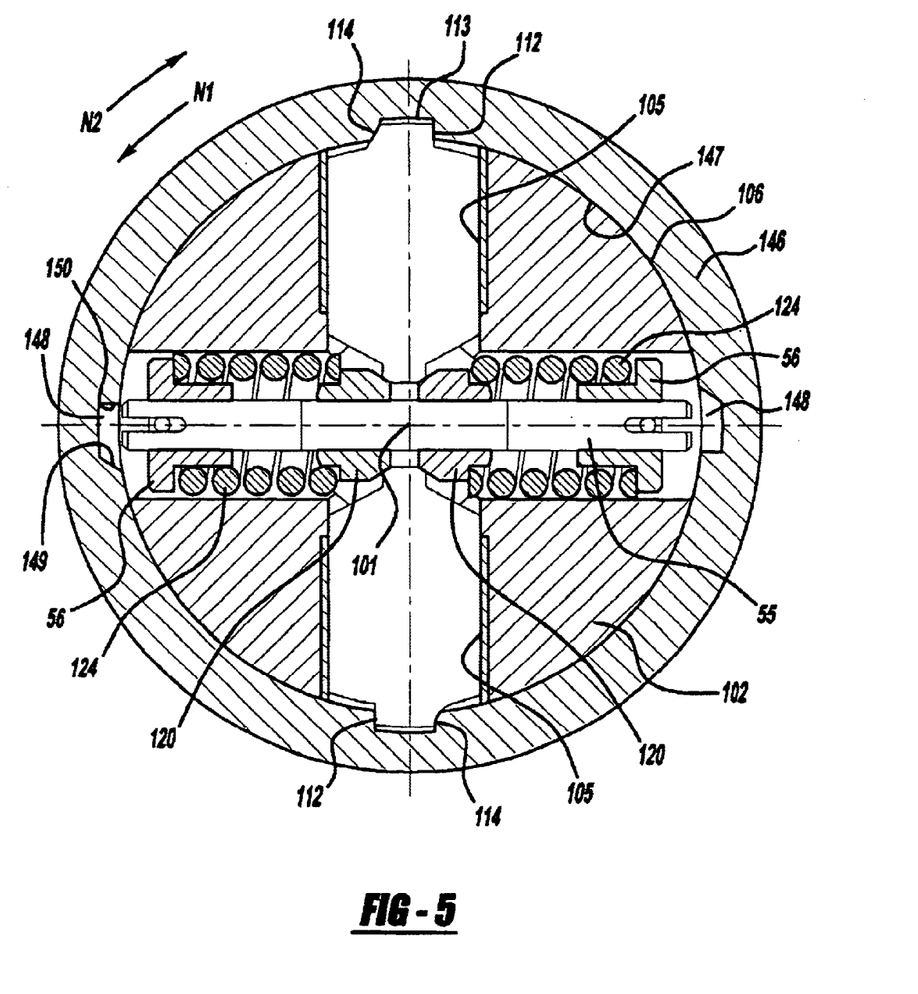
FIG. 5 is a section view along line V—V of FIG. 4.
Figure 6:
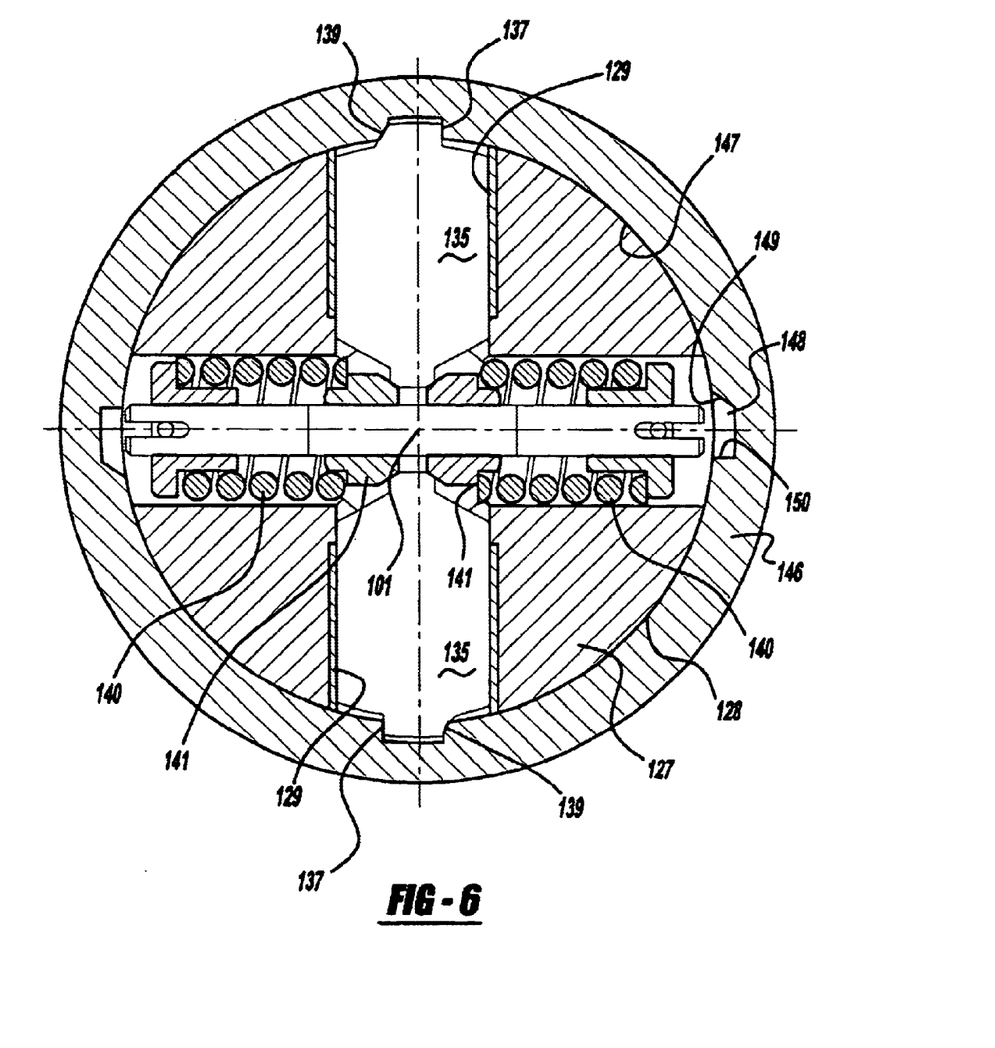
FIG. 6 is a section view along line VI—VI of FIG. 4.

FIGS. 4 to 6 show a second embodiment of a torque limiting coupling. Any designs and parts which are comparable to the torque limiting coupling according to FIGS. 1 to 3 have been given reference numbers which have been increased by the value 100 as compared to FIGS. 1 to 3. Below, the differences will be explained in greater detail.

The longitudinal axis around which the torque limiting coupling rotates has been given the reference number 101. Again, the torque limiting coupling comprises a first coupling hub 102 with first recesses 105 which start from the first outer face 106 of the first coupling hub 102. The recesses 105 extend radially relative to the longitudinal axis 101 and are provided in the form of cylindrical bores. Correspondingly cylindrically designed first driving members 110 are radially adjustably guided in said first recesses 105.

A total of two first driving members 110 are provided and arranged on one axis. The first driving member 110, at its head which, in the torque transmitting position, projects beyond the first outer face 106, has a first torque transmitting face 114. The first torque transmitting face 114 is arranged at an acute angle relative to the radius on which the first recess 105 is arranged. A second torque transmitting face 112, facing away from said first torque transmitting face 114, extends approximately parallel to the axis of the first recesses 105.

A supporting assembly, arranged centrally in a bore which extends transversely to the first recesses 105, includes a bolt 55. The bolt 55 is threaded at its two ends on to which there are threaded nuts 56. The threaded nuts 56 support one end of first springs 124. The other end of the spring 124 is supported against a first supporting member 120. The first supporting members 120 are symmetrically supported on corresponding faces at the base of the first driving members 110. This assembly ensures that the first driving members 110 are loaded in diametrically opposed directions away from one another into the torque transmitting position.

A second coupling hub 127 is shown in a sectional view in FIG. 5. The second hub 127 has a second circular-cylindrical outer face 128. Second recesses 129 start from outer face 128 in the form of cylindrical bores. Two second recesses 129 include a common bore axis which extends radially relative to the longitudinal axis 101.

The two second recesses 129 each receive a second driving member 135. The second driving member 135 include a cylindrical outer face so as to be radially adjustable relative to the longitudinal axis 101. At its head which, in the torque transmitting position, projects beyond the second outer face 128, a third torque transmitting face 139 is provided. A fourth torque transmitting face 137 is provided facing away from the third torque transmitting face 139. The third torque transmitting face 139 extends at an acute angle relative to the bore axis of the second recesses 129.

At their radially inner ends, the two second driving members 135 are supported by a supporting assembly. The supporting assembly includes two supporting members 141 which, by means of two second springs 140 positioned on a bolt 55, are loaded towards the torque transmitting position.

The second coupling hub 127 includes a second attaching bore 145. Both coupling hubs, the first coupling hub 102 and the second coupling hub 127, are received along the longitudinal axis 101 one behind the other in a circular-cylindrical bearing bore 147 of the coupling sleeve 146. Grooves 148, which extend parallel relative to the longitudinal axis 101, are formed in the bearing bore 147. The grooves 148 are circumferentially distributed and have supporting face 149. The supporting face 149 establishes contact for the first torque transmitting face 114 and the third torque transmitting face 139. The side face 150, in the torque transmitting position, comes to rest against the second torque transmitting face 112 and the fourth torque transmitting face 137. All the grooves 148 are identical in design. Their function corresponds to that described in connection with FIGS. 1 to 3. This means that, when the first coupling hub 102 is driven in the direction of rotation N1, the hub 102 transmits the torque to the two driving members 110 and from there, via their first torque transmitting faces 114, to the supporting faces 149 of the grooves 148 and thus to the coupling sleeve 146. As a result of the contact between the side face 150 and the fourth torque transmitting face 137 of the driving member 136 in the second coupling hub 127, the coupling sleeve 146 transmits the torque in its full amount to the second coupling hub 127. The further function regarding disconnection, when the torque is exceeded in the direction of rotation N1 as well as regarding the transmission of torque in the direction of rotation N2, also fully corresponds to the function as described in connection with the first embodiment of the torque transmitting coupling according to FIGS. 1 to 3.

With respect to both embodiments, it is significant that the first and second coupling hubs and the driving members associated with the hubs are identically designed. Also, one coupling sleeve is common to both coupling hubs. Thus, the torque can be limited in two driving directions of rotation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque limiting coupling for driving, or drives of, agricultural implements or machinery comprising:
   a longitudinal axis;
   a first coupling hub having a first outer face and first recesses starting from the first outer face;
   a first driving member per first recess, said first driving member being adjustably guided between a torque transmitting position, projecting beyond the first outer face of the first coupling hub, and a disconnected position, retracted back into said first outer face, and said first driving member, at its end, when in the torque transmitting position that projects from the first outer face, includes a torque transmitting face and, facing away, from said first torque transmitting face, a second torque transmitting face;
   at least one first spring per first driving member, said first spring loads said driving member for assuming the torque transmitting position and said first spring arranged in the first coupling hub;
   a second coupling hub having a second outer face with second recesses starting from the second outer face;
   a second driving member per second recess, said second driving member being adjustably guided in a second recess between a torque transmitting position, where said second driving member projecting beyond the second outer face, and a disconnected position, wherein said second driving member retracted into the second coupling hub, said second driving member, at its end projecting beyond the second outer face, including a third torque transmitting face and, facing away from said third torque transmitting face, a fourth torque transmitting face;
   at least one second spring per second driving member, said second spring loads the second driving member towards the torque transmitting position and said second spring received in the second coupling hub;
   one single coupling sleeve having a single bearing bore rotatably receiving both coupling hubs by their outer faces and said coupling hubs arranged along the longitudinal axis one behind the other, said single coupling sleeve in the single bearing bore having grooves distributed according to the first and second recesses of the two coupling hubs, said grooves extend parallel relative to the longitudinal axis across said single coupling sleeve and said grooves having a supporting face which is adapted to contact identically designed first and third torque transmitting faces of the first and second driving members and extending along the length of the groove and a side face of the groove positioned opposite the supporting face is adapted to contact identically designed second torque transmitting face of the first driving member and fourth torque transmitting face of the second driving member.

2. The torque limiting coupling according to claim 1, wherein the first driving members and the second driving members at their respective ends arranged in the first and second recesses, each include two load faces arranged at different angles and per first and second driving member a supporting member is provided that includes two pressure faces corresponding to the load faces and said supporting member being received between the first and, respectively, the second spring and the associated first and, respectively, the second driving member of the first and, respectively, second coupling hub.

3. The torque limiting coupling according to claim 2, wherein the supporting members are received in the first and, respectively, second recess.

4. The torque limiting coupling according to claim 1, wherein the first and second springs are received in a respective bore of the associated first and, respectively, second coupling hub and that the respective bores are open towards the associated first or second recess.

5. The torque limiting coupling according to claim 1, wherein towards the supporting faces of the grooves, the bearing bore includes a chamfer.

6. The torque limiting coupling according to claim 1, wherein a separating disk is arranged between the first coupling hub and the second coupling hub.

7. The torque limiting coupling according to claim 1, wherein at end faces of the first coupling hub and the second coupling hub, said end faces facing away from one another, a supporting disk is arranged, each supporting disk held by a securing ring fixed to the coupling sleeve.

8. The torque limiting coupling according to claim 1, wherein the first coupling hub and the second coupling hub each include an attaching bore.

9. The torque limiting coupling according to claim 1, wherein the first recesses and/or the second recesses are designed to be slot-like and extend parallel relative to the longitudinal axis.

10. The torque limiting coupling according to claim 9, wherein a second contact face includes the second torque transmitting face and a fourth contact face includes the fourth torque transmitting face.

11. The torque limiting coupling according to claim 1, wherein two first driving members and/or two second driving members are provided each jointly loaded by centrally arranged first and second supporting members.

* * * * *

UNITED STATES PATENT AND TRADEMARK OFFICE
CERTIFICATE OF CORRECTION

PATENT NO. : 6,896,621 B2
DATED : May 24, 2005
INVENTOR(S) : Carstensen et al.

It is certified that error appears in the above-identified patent and that said Letters Patent is hereby corrected as shown below:

<u>Title page,</u>
Item [75], Inventors, "Cologne (DE)" should be -- Koln (DE) --.

<u>Column 7,</u>
Line 36, delete "which".

Signed and Sealed this

Sixth Day of September, 2005

JON W. DUDAS
*Director of the United States Patent and Trademark Office*